G. E. SEYMOUR.
GEARING.
APPLICATION FILED OCT. 21, 1912.

1,107,454.

Patented Aug. 18, 1914.

Witnesses
C. H. Walter.
S. Ford

Inventor
George Edgar Seymour.
by R. Haddan
Attorney

UNITED STATES PATENT OFFICE.

GEORGE EDGAR SEYMOUR, OF NEWCASTLE-UPON-TYNE, ENGLAND.

GEARING.

1,107,454.   Specification of Letters Patent.   Patented Aug. 18, 1914.

Application filed October 21, 1912.   Serial No. 726,941.

*To all whom it may concern:*

Be it known that I, GEORGE EDGAR SEYMOUR, a subject of the King of England, residing at Newcastle-upon-Tyne, in England, have invented certain new and useful Improvements in Gearing, of which the following is a specification.

Figure 1:
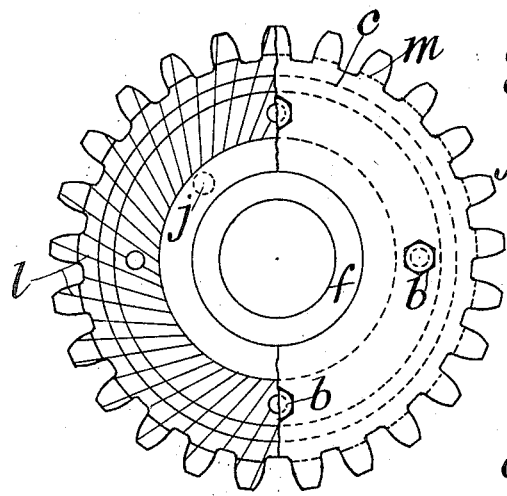
Figure 2:
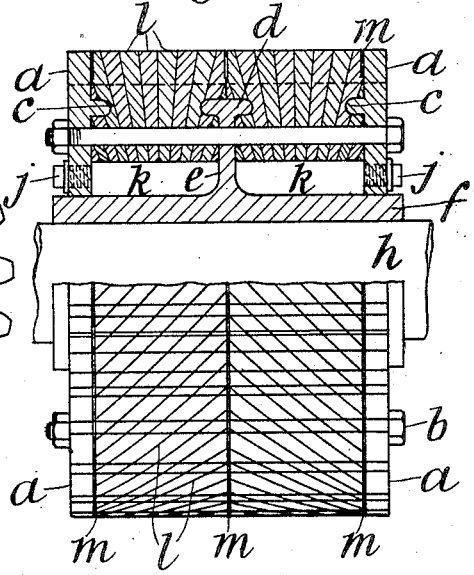
Figure 3:
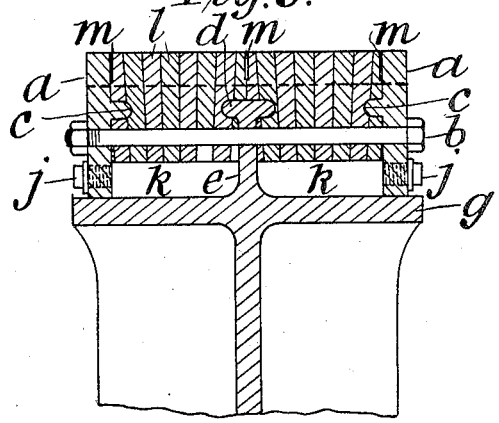

This invention consists in improvements in and relating to toothed and worm gearing of that type in which the teeth are formed of metallic or other laminæ, the invention residing in means for lubricating said teeth, and in certain details of construction all as hereinafter fully described and specifically pointed out in the appended claims reference being made to the accompanying drawings in which:

Figure 1 is a side elevation of a spur pinion constructed according to this invention with exterior parts broken away. Fig. 2 is a sectional elevation of the pinion shown in Fig. 1, and Fig. 3 a partial cross section through a gear wheel.

The gear wheels shown in the drawings comprise a boss $f$ (Figs. 1 and 2) or rim $g$ (Fig. 3) with a central flange $e$ integral with or fixed to $f$ or $g$ having at its outer end an annular projection extending laterally to each side thereof. The teeth of the wheel are formed of metallic laminæ $l$, shown exaggerated in thickness, held in place against the central flange by clamping rings $a$ one at each side, and by bolts or rivets $b$ extending through said laminæ, central flange, and the clamping rings, the latter being provided with interior annular projections $c$. The said rings are shown as extending to the outer surface of the teeth, but they may terminate at some distance within said outer surface if desired. The laminæ $l$ are kept well clear of the boss $f$ or of the rim $g$ so that an annular space $k$ is formed between said boss or rim and the laminæ, this space extending between the clamping rings, for the reception of a suitable lubricant which is introduced through a hole in one or both of the clamping rings, said hole or holes being closed as by a screwed plug $j$. In operation, the lubricant in said space $k$, helped by centrifugal action, makes its way between the laminæ to the working faces of the teeth. The annular projections $c\ d$ on the clamping rings and on the central flange $e$ respectively are rounded to reduce any tendency to form a line of fracture in the laminæ. As the bolts or rivets $b$ pass through the laminæ and the central flange the drive is through the bolts.

From experience I find that in any pinion or wheel when working at its full load the noise is scarcely observable, but with lighter loads on the same pinion or wheel the noise is increased, and is loudest with no load. To overcome this I make one or more fine saw cuts $m$, produced by a saw or parting tool, extending for nearly the depth of the teeth all round the pinion or wheel across the teeth, these cuts being either parallel to the clamping rings as shown or in the form of a helix. By these means the gearing when working is practically noiseless. In Fig. 2 $h$ designates a shaft passing through the boss $f$. The laminæ are preferably wedge-shaped, tapering toward the center of the gear and extending diagonally with respect to the axis of the gear.

What I claim as my invention and desire to secure by Letters Patent of the United States is:—

1. A gear comprising an annular tooth supporting member, and teeth formed of helicoidally disposed laminæ spaced outwardly from said member to form the outer wall of a chamber for the reception of lubricant, the meeting faces of said laminæ extending from said chamber to the working face of said teeth whereby the lubricant is forced between said meeting faces to the working faces of the teeth by centrifugal action, means for pressing said laminæ adjustably toward one another, and means for positively transferring the drive between the laminæ and the tooth supporting member.

2. A gear comprising an annular tooth supporting member, helicoidally disposed metallic laminæ forming teeth spaced outwardly from said member to form the outer wall of a chamber for the reception of lubricant, clamping elements mounted on said supporting member outside the laminæ to form the end walls of said chamber, said clamping elements having an opening permitting introduction of the lubricant, a closure for such opening, and adjustable tie members traversing said laminæ and clamping elements.

3. A gear comprising an annular tooth supporting member having a central flanged web thereon, metallic laminæ forming teeth spaced radially outward from said member to form the outer wall of a chamber for the reception of lubricant, said central web dividing said chamber into two separate chambers, clamping rings engaging the supporting members at opposite ends of the laminæ and forming the outer end walls of said chambers, each of said rings having an opening for the introduction of the lubricant into the chambers, a plug in each opening, and bolts traversing said laminæ, central flange and clamping rings, and nuts for adjusting the clamping pressure of said bolts.

4. A gear comprising an annular tooth supporting member, and teeth formed of helicoidally disposed laminæ spaced outwardly from said member to form the outer wall of a chamber for the reception of lubricant, the meeting faces of said laminæ extending from said chamber to the working face of said teeth whereby the lubricant is forced between said meeting faces to the working faces of the teeth by centrifugal action, means for pressing said laminæ adjustably toward one another, and means for positively transferring the drive between the laminæ and the tooth supporting member, said teeth being provided with saw cuts therethrough extending around the periphery of the gear.

5. A gear comprising a boss or rim, teeth formed of helicoidally disposed metallic laminæ spaced outwardly from said boss or rim to afford a chamber for reception of lubricant, said teeth having saw cuts thereacross extending around the periphery of the gear, clamping elements mounted on said boss or rim outside the laminæ, and having a closable orifice for introduction of lubricant to said chamber, and tie members traversing said laminæ and clamping members.

In witness whereof I have signed this specification in the presence of two witnesses.

GEORGE EDGAR SEYMOUR.

Witnesses:
   H. M. H. NIXON,
   C. S. GARDNER.